United States Patent [19]

Reischl

[11] 4,086,193
[45] Apr. 25, 1978

[54] MICROPOROUS SHEETS AND A PROCESS FOR MAKING THEM

[75] Inventor: Artur Reischl, Leverkusen, Germany

[73] Assignee: Bayer Aktiengesellschaft, Leverkusen, Germany

[21] Appl. No.: 501,575

[22] Filed: Aug. 29, 1974

[30] Foreign Application Priority Data

Sep. 7, 1973 Germany .............................. 2345256

[51] Int. Cl.$^2$ ............................................. C08G 18/14
[52] U.S. Cl. ....................... 260/2.5 AY; 260/29.2 TN; 260/77.5 Q
[58] Field of Search .................. 260/2.5 AY, 29.2 TN, 260/77.5 Q

[56] References Cited

U.S. PATENT DOCUMENTS

| 3,296,190 | 1/1967 | Reischl et al. .................. 260/46.5 E |
| 3,763,054 | 10/1973 | Reischl et al. .................. 260/2.5 AY |

OTHER PUBLICATIONS

DAS 1,270,276, June 1968, Bayer A/G (Zorn et al.), 16 pages.

Primary Examiner—H.S. Cockeram
Attorney, Agent, or Firm—Gene Harsh; Joseph C. Gil; William E. Parry

[57] ABSTRACT

A method for making microporous sheets is provided wherein a dispersion of a cationic and/or anionic polyurethane is mixed with a solution containing a non-ionic polyurethane and the resulting mixture is coagulated with a non-solvent for the non-ionic polyurethane.

14 Claims, No Drawings

MICROPOROUS SHEETS AND A PROCESS FOR MAKING THEM

This invention relates to a process for producing microporous sheets by coagulating polyurethane or polyurea solutions.

Numerous processes are already known for producing coatings, which are permeable to water vapor, from solutions, (e.g. in dimethylformamide), of polyurethanes by coagulating the solutions with non-solvents (e.g. water). In these processes, the desired microporous structure of the polymers is achieved by observing strictly laid down conditions during the coagulation process.

The use of polyurethane or polyurethane urea solutions in highly polar solvents, e.g. dimethylformamide or dimethyl acetamide, (optionally in the presence of other polymers, e.g. polyvinyl chloride or polyacrylonitrile), for producing films or coatings on woven fabrics or as binders for non-woven webs is known. This is achieved by processes in which the solvent is removed by treatment with water, glycerol or other liquids which are miscible with the above-mentioned highly polar solvents but incompatible with the polyurethanes. The above process was described for the first time in German Patent Specification No. 888,766, which also mentions the use of other solvents which are generally non-solvents for the polyurethane (e.g. methylene chloride, acetone or benzene).

Numerous later publications disclose special process steps to ensure, with varying degrees of reliability, that products with a microporous structure will be obtained. Thus, in German Patent Specification No. 1,110,607, it is proposed to coagulate polyurethanes based on polyethers by exposing hygroscopic polyurethane solutions (using e.g. dimethylformamide as solvent) to the action of a stationary or circulating atmosphere, containing water vapor at a relative humidity of from 15% to 100% at a temperature of from 10° to 38° C, measured with a dry-bulb thermometer. Absorption of water takes place because the solvent is hygroscopic, and the polyurethane starts to precipitate from the solution on the surface, presumably with preformation of the microporous structure. When films or coatings which have been pregelled in this way are placed in water, the solution coagulates and the hygroscopic solvent is completely removed from the film.

The method disclosed in DAS No. 1,110,607 requires an atmosphere with an accurately adjusted moisture content and prolonged exposure to this moist atmosphere. However, the results can hardly be regarded as technically reproducible, and, evidently, the method may only be employed with polyether urethanes. If pre-gelling by the action of the moist atmosphere, as described above, is omitted, then the films obtained are either transparent and impermeable to water vapor or nonhomogeneous with coarse pores and therefore unusable for the intended purpose.

German Offenlegungsschrift No. 1,444,163 discloses a slightly modified process which is carried out as follows: By adding minor quantities of non-solvents (e.g. water), the polyurethane solution is first brought to a state of early phase separation, i.e. it is converted into a slightly cloudy form resembling a dispersion, before it is coagulated directly by immersion in the non-solvent (after having been painted on a support), in other words without first being gelled in a moist atmosphere.

When carrying out the process disclosed in DOS No. 1,444,163, it is difficult to find the correct quantity of non-solvent for preparing the colloidal dispersions. Furthermore, the process uses starting materials in an unstable state in that the properties of the dispersion change in the course of time depending upon the temperature and the degree of moisture. The elastomer dispersion is converted into a "pasty" state in which it can no longer be shaped satisfactorily.

Another process is described in German Offenlegungsschrift No. 1,444,165, according to which the polymer solution is said to be converted into microporous sheets by direct coagulation, in a mixture of non-solvent and solvent, (e.g. dimethylformamide/$H_2O$ in proportions of between 10:90 and 95:5), without the preliminary gelling.

The method disclosed in DOS No. 1,444,165 requires prolonged coagulation times, especially in the case of baths with a large quantity of solvent, because the polyurethane coagulates slowly. The capacity of a given production unit is therefore substantially reduced.

According to another variation which has been described in Belgian Patent Specification No. 624,250, a sufficient quantity of non-solvent is added to the polyurethane solution to cause the polymer to separate in the form of a gel. It is in the form of this gel that the polymer is painted on to a substrate and then coagulated with non-solvent (water), to form a microporous structure. In this process, however, it is technically difficult to separate the gel and then form it into a homogeneous coating.

In German Auslegeschrift No. 1,238,206, it is stated that the direct coagulation of elastomer solutions results in microporous structures if the coating on the substrate is coagulated in a bath which is heated to a temperature close to its boiling point, e.g. 95° C in the case of water.

Somewhat improved results are obtained if pre-gelling is also carried out at an elevated temperature. For example, in DOS No. 2,025,616, there is described a process for producing microporous sheets in which a thin layer of a polyurethane solution is exposed to a damp atmosphere, having a relative humidity of at least 50% at temperatures above 65° C, and the major proportion of solvent is then removed in aqueous coagulation baths, the product is then dried.

According to DOS No. 2,125,908, steam, at a temperature of from 101° to 190° C, is passed over a layer of a polyurethane solution until the organic solvent content of the layer has dropped to below 50% by weight and the layer has been converted into a solid, mechanically stable microporous sheet. This process has the particular advantage that the microporous end-product is obtained from a polyurethane solution, within a short time and by a single process step.

The state of the art described above, showing the wide range of processes known, would lead one to expect that it should, in principle, be possible to produce microporous films or coatings by coagulating polyurethane solutions under any operating conditions (temperature, ratio of solvent to precipitating agent, pre-gelling time, coagulation bath).

In practice, however, it is found that all the processes mentioned above are unreliable and give rise to usable end products only if quite specific polymer solutions are used in each case. This is especially important if the process is to be developed from the laboratory stage to the large scale mass production stage. Even slight variations in the chemical structure of the polyurethane result in homogeneous, transparent sheets which are impermeable to water vapor, even if the conditions of the process are otherwise completely identical.

The higher molecular weight polyesters and polyethers with hydroxyl end groups used in the synthesis of the polyurethane were found to be particularly sensitive in this respect. In many cases, the end products may vary from microporous to homogeneous even when using different batches of the same starting materials. Even basic types of polyesters and polyethers which are normally suitable must therefore be tested separately from batch to batch, to determine whether the finished polyurethane solution is coagulable, and be selected accordingly.

The usual parameters, e.g. molecular weight and OH number, cannot be used for testing the suitability of the starting components because even apparently very similar starting components, often result in polyurethane solutions with completely different coagulation characteristics. It is, therefore necessary, in each case, to prepare samples of the elastomer solutions and test their coagulation on a laboratory scale in order to find the necessary conditions, which, moreover, must be observed within very narrow limits. Some reaction mixtures, however, will, in all cases, result in the formation of only partly microporous or transparent sheets.

No explanation has so far been found for these surprising effects. In spite of many attempts it has not been possible to discover any components of the raw materials of elastomer solutions which interfer with the coagulation process by which microporous structures are obtained.

It has frequently been proposed to add certain coagulating agents to the polymer solutions to improve their coagulability, for example, DAS No. 1,270,276, and DOS Nos. 1,694,171 and 1,769,277, describe processes for producing sheets which are permeable to water vapor. According to these processes, solutions of from 90 to 70 parts, by weight, of polyurethanes or polyureas, free from NCO groups, and from 10 to 30 parts, by weight, of high molecular weight, substantially linear, cationic polyurethanes, containing from 0.5 to 2.0% by weight, of quaternary ammonium nitrogen atoms, are coagulated, with water or a mixture of water and solvent, optionally after being first gelled in moist air. In addition to the cationic polyurethanes, these solutions may also contain anionic tanning agents as additional coagulation regulators.

Although the addition of such known coagulating agents results in marked improvements in the coagulability of the polyurethane solutions, especially on a laboratory scale, the difficulties described above persist when the process is used on a mass production scale. The coagulability varies so much, from one batch of polyurethane to the next, that it remains necessary to go to the considerable expense of testing each elastomer solution before use to determine its suitability.

A particular problem arises when an anionic tanning agent is used, e.g. a sulphonic acid phenol formaldehyde condensate. Although these tanning agents improve the coagulation of certain polyurethanes, serious technical disadvantages arise. Most of the tanning agent, which is usually in the form of an alkali metal salt, is washed out in the coagulation bath which, in many cases, contains dimethylformamide and water. If cationic polyurethanes are used at the same time, these are also partly washed out, i.e. they bleed out, so that higher molecular weight impurities gradually accumulate under the conditions of the process and may cause damage to the porous sheet while it is still soft. The dissolved tanning agent, which constitutes the major proportion thereof, gives rise to difficulties in the recovery (by distillation) of the aqueous organic solvent (e.g. DMF) because the precipitated tanning agent must be removed from the solvent before the latter is distilled.

Another disadvantage is that the small quantity of phenol formaldehyde condensate remaining in the microporous sheet is sufficient to have a significant deleterious effect on its stability to light. Furthermore, microporous sheets coagulated under these conditions have a harder handle which is generally undesirable.

It is therefore an object of this invention to provide a process for making microporous polyurethane or polyurethane urea sheets which is devoid of the foregoing disadvantages. Another object of the invention is to provide a process for making polyurethane or polyurethane urea sheets by coagulation which does not require such accurate measurement of the components of the coagulateable solution as the prior art processes. Still another object of the invention is to provide a process for making microporous polyurethane and polyurethane urea sheets having improved resistance to hydrolysis.

The foregoing objects and others are accomplished in accordance with this invention, generally speaking, by providing a process for making microporous sheets wherein a cationic polyurethane and/or an anionic polyurethane is included in a solution containing a nonionic polyurethane or polyurethane urea in a polar solvent therefore, and the solution is coagulated by mixing a non-solvent therewith.

It has now surprisingly been found, that coagulation can be substantially improved, without the above mentioned disadvantages attendant upon the use of tanning agent, and can be carried out economically if the polyurethane solutions which are to be coagulated contain certain cationic or anionic suspensions of polyurethane ureas as such or preferably mixed in the form of salts. In this way, even the coagulation of polyurethane solutions which previously could not be utilized can be so regulated that sheets with a satisfactory microporous structure are obtained.

This invention thus provides a process for producing microporous sheets which are permeable to water vapor by coagulating hygroscopic polyurethane or polyurethane urea solutions, characterized in that a suspension of cationic and/or anionic polyurethanes or polyurethane ureas is added to the polyurethane or polyurethane urea solution before coagulation.

Combinations which contain a very small proportion of ionic groups and a high proportion of separately prepared, non-ionic polyurethanes or polyurethane ureas are particularly advantageous. The sum of cationic and anionic groups, based on 100 g of microporous polyurethane sheets, is from about 0.30 to 0.0001, preferably from 0.05 to 0.005 ionic equivalents. The equivalent ratio of cationic groups to anionic groups is preferably from about 20:1 to about 1:20 and more particularly from about 10:1 to about 1:2.

A special advantage obtained by using mixed dispersions, according to the present invention, as compared with the known method of using cationic polyurethanes as coagulation regulators, is that, for a given coagulation regulating effect, the total ion content required is much lower. The films and coatings produced, according to the invention, therefore, have a higher resistance to hydrolysis. The amount of swelling in water is also much less, for a given number of ionic groups, if the film contains both cationic and anionic polyurethanes.

Numerous compounds, obtained by a wide variety of different methods, may be used as non-ionic polyurethanes in the process of the present invention, however, they all contain the typical urethane groups (see Ullmann, Enzyklopädie der technischen Chemie, 4th Edition, Volume 14, pages 338 to 363).

For example, polyurethanes, in the strict sense of the word, may be used, which may be obtained from higher molecular weight polyhydroxyl compounds, glycols and diisocyanates by single stage or multistage processes (via NCO prepolymers). For example, polyesters or polyethers may be reacted under substantially anhydrous conditions with an excess of organic diisocyanate to produce NCO prepolymers which may then be chain lengthened with equivalent or slightly less than equivalent quantities of diol compounds, e.g. butane-1,4-diol, N-methyl-diethanolamine, hydroquinone-bis-(hydroxyethylether) or bis-hydroxyethyl terephthalate. This method may be carried out either with or without solvent. Alternatively, the components may be directly converted into elastomers by a single stage (one-shot) process and the elastomers may then be dissolved in highly polar solvents.

The polyurethane ureas described as "Component a" in British Patent 1,145,200 are also particularly suitable. To prepare these polyurethane ureas, higher molecular weight, substantially linear polyhydroxyl compounds, which contain hydroxyl end groups and have a molecular weight of from about 400 to about 5000, and optionally low molecular weight glycols, aminoalcohols or diamines, are first reacted under substantially anhydrous conditions with an excess of organic diisocyanate to produce a prepolymer, with isocyanate end groups, which is then reacted with water, or with bifunctional compounds in which at least one of the hydrogen atoms, which are reactive with isocyanates, is attached to a nitrogen atom. Because of the much higher reactivity and reaction velocity of these chain lengthening agents compared with diols, the reaction is preferably carried out in highly polar, water-miscible solvents which have boiling points above 100° C.

Methods of preparing such polyurethanes and polyurethane ureas and their solutions have been described, for example, in German Patent Specification Nos. 888,766, 1,150,517 and 1,154,937, German Auslegeschriften Nos. 1,161,007, 1,183,196 and 1,186,618, Belgian Patent Specification No. 649,619, French Patent Specification Nos. 1,380,082, 1,371,391 and 1,383,077 and U.S. Pat. Nos. 3,432,456, 3,379,683, 3,376,264, 3,536,668, 3,461,106, 3,507,834 2,929,803, 2,929,804, 3,040,003 and 3,461,101.

Higher molecular weight, substantially linear polyhydroxyl compounds, with hydroxyl end groups, which are suitable for preparing elastomer polyurethanes are, e.g. polyesters, polyester amides, polyethers, polyacetals, polycarbonates or poly-N-alkylurethanes, with molecular weights from about 400 to about 5000 and melting points preferably from 60° C to −50° C, or mixtures of such compounds, including those which contain ester, ether, amide, urethane or N-alkylurethane groups.

Any suitable polyester prepared from an aliphatic, cycloaliphatic, aromatic or heterocyclic dicarboxylic acid or its esters or anhydrides and a glycol, such as adipic acid, succinic acid, azelaic acid, sebacic acid, phthalic acid, isophthalic acid, phthalic acid anhydride, tetrahydrophthalic acid, hexahydrophthalic acid anhydride, endomethylene tetrahydrophthalic acid anhydride, glutaric acid, maleic acid, maleic acid anhydride, oxalic acid, terephthalic acid dimethyl ester, terephthalic acid-bis-glycolic ester, and a glycol or a mixture of glycols, e.g. ethylene glycol, propylene glycol -(1,2) and -(1,3),butane-1,4-diol, butane-1,2-diol, 2,2-dimethylpropane-1,3-diol, hexane-1,6-diol, bis-hydroxymethylcyclohexane, diethylen glycol, triethylene glycol, tetramethylene glycol, dipropylene glycol, dibutyléne glycol, glycerol, trimethylol propane or the like may be used. Glycols or mixtures of glycols, which contain five or more carbon atoms are preferred because of the high resistance to hydrolysis found in the polyesters prepared from them.

Polyesters, with a narrow molecular weight distribution, which are obtained by the condensation of caprolactone and amines or diols, e.g. hexane-1,6-diol, are also suitable.

Exceptionally high quality microporous sheets, with excellent surface properties and good permeability to water vapor, may be obtained from copolyesters which have been prepared from about 90% to about 60%, by weight, of adipic acid and from about 10% to about 40%, by weight of terephthalic acid, and a diol, preferably ethylene glycol, butane-1,4-diol, neopentyl glycol and/or hexane-1,6-diol.

Exceptionally high resistance to hydrolysis may be obtained in the polyurethanes if the higher molecular weight polyhydroxyl compounds used are dihydroxypolycarbonates based on hexane-1,6-diol, or copolycarbonates which have been prepared with the addition of small quantities (up to about 20 mol percent) of dicarboxylic acids, preferably adipic acid. Mixtures of the above-mentioned compounds may also be used.

Polyurethane ureas with excellent resistance to hydrolysis can also be obtained from polyhydroxy polyethers, which may, if desired, also be used as copolyethers. Suitable polyethers may be prepared by methods known per se, e.g. by polymerisation of epoxides such as ethylene oxide, propylene oxide, butylene oxide, tetrahydrofuran or epichlorohydrin either with themselves, e.g. catalysed by boron trifluoride, or by using starting components with acidic hydrogen atoms such as alcohols or amines, e.g. water, ethylene glycol, propylene glycol- (1,3) or -(1,2), trimethylol propane, aniline, ammonia, ethanol amine, ethylene diamine etc. Polytetramethylenether diols are preferably used.

Graft polymers obtained from partially saponified ethylene-vinyl ester copolymers and vinyl compounds, as described in U.S. Pat. No. 3,400,173 are also suitable higher molecular weight polyhydroxyl compounds.

The graft polymers are composed of from about 10% to about 70%, preferably from about 15% to about 60%, of an ethylene/vinyl ester copolymer which is from about 10% to about 80% saponified and originally contained from about 25% to about 75% vinyl ester, and from about 30% to about 90% of vinyl chloride polymer. The preparation of such polymers has been described, for example, in French Patent Specification No. 1,409,527.

When preparing the graft polymers, minor quantities of other monomers may also be added, e.g. vinyl esters, $\alpha,\beta$-unsaturated monocarboxylic and/or dicarboxylic acids, containing 3 or 4 carbon atoms, and their derivatives, e.g. hydroxyalkyl acrylates and methacrylates, or maleic acid semiesters. These monomer or monomer mixtures may amount to 40% of the total quantity of momomer mixture which is to be grafted on the stock. The preparation of these graft polymers has been described, for example, in U.S. Pat. No. 3,355,516.

Any suitable organic diisocyanate may be used, for example, aliphatic, cycloaliphatic, araliphatic, aromatic or heterocyclic diisocyanates or mixtures thereof. Diisocyanates with a symmetrical structure should be particularly mentioned, e.g. diphenylmethane-4,4'-diisocyanate, diphenyl-dimethylmethane-4,4'-diisocyanate, 2,2'-6,6'-tetramethyl-diphenylmethane diisocyanate, diphenyl-4,4'-diisocyanate, diphenylether-4,4'-diisocyanate, or their alkyl, alkoxy or halogen substituted derivatives; tolylene-2,4- and -2,6-diisocyanate and commercial mixtures thereof, diisopropyl-phenylenediisocyanate, m-xylylene diisocyanate, p-xylylene diisocyanate, α,α,α',α'-tetramethyl-p-xylylene diisocyanate or their alkyl or halogen substituted derivatives, dimeric tolylene-2,4-diisocyanate, bis-(3-methyl-4-isocyanatophenyl)-urea or naphthylene-1,5-diisocyanate. Aliphatic and cycloaliphatic diisocyanates, e.g. hexamethylene diisocyanate, cyclohexane-1,4-diisocyanate, dicyclohexylmethane-4,4'-diisocyanate, 1-isocyanato-3-isocyanatomethyl-3,5,5-trimethylcyclohexane or 2,2,4-trimethylhexane-1,6-diisocyanate, give rise to products which undergo very little discoloration on exposure to light.

The diisocyanates used are, preferably, diphenylmethane-4,4'-diisocyanate, the isomeric tolylene diisocyanates and p-phenylenediisocyanate, as well as hexamethylene diisocyanate and dicyclohexylmethane-4,4'-diisocyanate, the last two being used, optionally, in addition to other diisocyanates.

The higher molecular weight polyhydroxyl compounds are reacted with the diisocyanates in molar ratios of from about 1:1.25 to about 1:6.0 at temperatures of from about 20° to about 130° C, preferably from about 40° to about 100° C. The reaction may be carried out in several stages, either without solvent or in the presence of solvents which are inert towards isocyanates, e.g. tetrahydrofuran, dioxane, chlorobenzene and dimethylformamide.

The reaction is carried out for such a length of time that the product obtained is a substantially linear prepolymer, with NCO end groups, which, when reacted with approximately equivalent quantities of bifunctional chain lengthening agents, yields a substantially linear elastomeric polyurethane or polyurethane urea, which is soluble in polar solvents.

As mentioned above, low molecular weight diols, (molecular weight preferably below 250), e.g. ethylene glycol, butane-1,4-diol, bis-N,N-(β-hydroxyethyl)-methylamine, bis-N,N-(β-hydroxypropyl)-methylamine, N,N'-bis-hydroxyethylpiperazine or hydroquinone-bis-(β-hydroxyethylether), may also be used together with the higher molecular weight polyhydroxyl compounds. The quantity of low molecular weight diols used is preferably such that the reaction mixture contains from about 0.1 to about 4 mols of OH groups, from the low molecular weight diol, for each mol of OH groups from the higher molecular weight polyhydroxyl compound. Diols which contain tertiary nitrogen atoms increase the dye affinity, improve the light fastness and produce the active points for subsequent after treatments, e.g. cross-linking, with strong alkylating agents.

The NCO group content of the prepolymers, (based on solvent-free prepolymer), is of major importance in determining the properties of the resulting polyurethane ureas. It must be at least 0.75% by weight, and should preferably be from about 1.0 to about 7.6% by weight, and in particular from about 1.5 to about 5.5% by weight, in order to ensure that the polyurethane ureas will have sufficiently high melting points, tear resistances, elongations at break and stress characteristics. If the chain lengthening reaction is carried out using water, the NCO content is preferably higher, e.g. from about 3.5% to about 7.6% by weight, because in this case, some of the NCO groups are first saponified to amino groups.

The chain lengthening agents should have a molecular weight from 18 to about 500, preferably from 32 to about 350 and they may be reacted as mixtures or stepwise. Apart from water and the low molecular weight diols mentioned above, suitable chain lengthening agents include, for example, ethylene diamine, propylene-1,2- and -1,3-diamine, tetramethylene-1,4-diamine, hexamethylene-1,6-diamine, 2,2,4-trimethylhexane-1,6-diamine, 1-methylcyclohexane-2,4-diamine, 4,4'-diaminodicyclohexylmethane, bis-(aminopropyl)-methylamine, N,N-bis(aminopropyl)-piperazine, araliphatic diamines, e.g. 1,5-tetrahydronaphthalene, or aromatic diprimary amines, e.g. 4,4'-diaminodiphenylmethane, 4,4'-diaminodiphenylether and 1-methyl-2,4-diaminobenzene, or aralipatic diprimary diamines e.g. m-xylylenediamine, p-xylylenediamine, α,α,α',α'-tetramethyl-p-xylylene diamine or 1,3-bis-(β-aminoisopropyl)-benzene, hydrazine compounds, e.g. carbodihydrazide, adipic acid dihydrazide, succinic acid dihydrazide, glutaric acid dihydrazide, pimelic acid dihydrazide, hydracrylic acid dihydrazide, terephthalic acid dihydrazide, isophthalic acid dihydrazide, β-semicarbazido-ethane-carbazic ester, β-aminoethyl-semicarbazide, β-semicarbazido-propionic acid hydrazide or 4-semicarbazidobenzoic acid hydrazide; also hydrazine hydrate or N,N'-diaminopiperazine. These chain lengthening agents may be used singly, as mixtures or together with water.

Secondary diamines may also be used (but preferably less than 30 mols percent), preferably those with a symmetrical structure, e.g. piperazine or 2,5-dimethylpiperazine.

When mixtures of chain lengthening agents are used, the solubility of the polyurethane ureas generally increases and the melting point of the elastomers decreases. The preferred chain lengthening agents are butane-1,4-diol, ethylene diamine, m-xylylene diamine, hydrazine, carbodihydrazide, aliphatic dicarboxylic acid hydrazide, e.g glutaric acid dihydrazide, and water.

The reaction of the NCO prepolymers with the chain lengthening agents is carried out in highly polar, water-miscible solvents which have boiling points above 130° C. They may be solvents which contain amide or sulphoxide groups and have the capacity to form powerful hydrogen bridge bonds, e.g. dimethylformamide, N-methyl-pyrrolidone, diethylformamide, dimethylacetamide, formyl morpholine, hexamethylphosphoramide, dimethylsulfphoxide, tetramethylurea and the like, or mixtures thereof. The preferred solvent, for commercial processes, is dimethylformamide.

A certain proportion of less highly polar solvents, e.g. tetrahydrofuran, dioxane, acetone or glycol monomethylether acetate, which are not capable on their own of dissolving the polyurethane ureas, may be added to the highly polar solvents. The proportion in which these less polar solvents may be used depends on the chemical composition of the polyurethane and amounts of up to about 35% by weight of the total quantity of solvent. The concentration of the elastomer solutions should preferably be from about 5% to about 33% by weight, in particular from about 15% to 27% by weight and the viscosity preferably from 1 to 1000 poises at 25° C and, more particularly, from 50 to 800 poises at 25° C.

Polyurethane elastomers, obtained by reacting bis-chlorocarbonic acid esters or bis-carboxylic acid chlorides with diamines are also suitable (one of the components of the reaction in each case being preferably a higher molecular weight compounds with a molecular weight of from about 400 to about 5000). The reaction products of higher molecular weight bis-chloroformic acid esters of polyhydroxyl compounds with diamines and the reaction products of higher molecular weight compounds, which contain amino end groups, (prepared e.g. from polyhydroxyl compounds and diisocyanates and chain lengthening agents, with a large excess of compounds which contain $NH_2$ end groups), with bis-acid chlorides or bis-chloroformic acid esters may be mentioned as examples. Compounds of this kind have been mentioned e.g. in U.S. Pat. Nos. 2,929,801, 2,929,802, 2,962,470 and 2,957,852.

Segmented polyester or polyether elastomers such as those described, for example, in British Pat. No. 1,017,614, U.S. Pat. Nos. 3,238,178, 3,261,812 and 3,277,060 and in Belgian Pat. No. 574,385 are also suitable.

Cationic polyurethanes suitable for use according to the present invention may be obtained, for example, by the process described in British Pat. No. 1,145,200 if at least one of the components used for synthesizing the polyurethane contains one or more basic tertiary nitrogen atoms and the basic tertiary nitrogen atoms of the polyurethane are reacted with alkylating agents or inorganic or organic acids. The positions of the basic nitrogen atoms in the polyurethane macromolecule are immaterial.

The polymers, which generally contain quaternary ammonium groups, have a partially hydrophilic character, and can be dispersed or form colloidal solutions in water or aqueous liquids, e.g. mixtures of water and dimethylformamide, without the aid of emulsifying or wetting agents.

Conversely, polyurethanes which contain reactive halogen atoms capable of being quaternized may be reacted with tertiary amines. Furthermore, cationic polyurethanes may be prepared by a reaction accompanied by chain lengthening quaternization. For example, by preparing dihalourethanes from diols (optionally higher molecular weight) and isocyanates which contain reactive halogen atoms or diisocyanates and halogenated alcohols and then reacting these dihalourethanes with ditertiary amines.

Conversely, ditertiary diaminourethanes may be prepared from compounds which contain two isocyanate groups and tertiary amino alcohols and these diaminourethanes may then be reacted with reactive dihalogen compounds.

The cationic polyurethane mass may, of course, also be prepared from a cationic salt-type starting component, e.g. a quaternized basic polyether or an isocyanate which contains quaternary nitrogen. These methods of preparation have been described, for example, in U.S. Pat. Nos. 3,388,087; 3,480,592; 3,686,108; 3,479,310 and 3,535,274, British Pat. No. 1,006,151 and German Auslegeschrift No. 1,179,363. Suitable starting materials for synthesizing the salt-type polyurethanes are also mentioned therein.

The aqueous dispersions, or colloidal solutions, of these cationic polyurethanes have particle sizes of from about 0.10 to about 100 μm. They may also contain organic solvents, e.g. acetones or dimethylformamide. The solvents used for preparing the dispersion, e.g. in accordance with U.S. Pat. Nos. 3,388,087 and 3,479,310 and German Auslegeschrift No. 1,178,586, therefore need not be removed from the dispersion. Moreover, high boiling solvents, e.g. dimethylformamide, may also be used for preparing the dispersion.

In the process of the present invention, it is preferred to use cationic polyurethanes which have been prepared from higher molecular weight polyhydroxyl compounds, molecular weights of from about 500 to about 5000, polyisocyanates, and a basic chain lengthening agent, containing tertiary, preferably aliphatically substituted, nitrogen atoms, e.g. N-methyldiethanolamine or N,N-bis-(aminopropyl)-methylamine, and, optionally, other non-basic chain lengthening agents preferably dialcohols or diamines, water, hydrazine or substituted hydrazines.

The polyurethane mass preferably contains from about 2% to about 12% of N-methyldiethanolamine. From about 10% to about 100% of the tertiary nitrogen atoms, thereby incorporated in the polyurethane mass, are quaternized with an alkylating agent, e.g. dimethylsulphate, methyl chloromethylether, diethylsulphate or bromoethanol, and, if desired, the remaining tertiary nitrogen atoms are partly or completely neutralized with an acid, e.g. hydrochloric acid, lactic acid or acetic acid, in the presence of water.

It is preferred to use at least a certain proportion of a bifunctional or trifunctional alkylating agent, e.g. dibromobutane, p-xylylene dichloride, 1,3-dimethyl-4,6-bis-chloromethylbenzene, methylene-bis-bromoacetamide or trimethylolpropane-tris-chloroacetic acid ester and bifunctional or trifunctional acids, having $P_K$ values below 4, e.g. phosphoric acid or sulphuric acid, in each case as aqueous solutions. These compounds initially react predominantly as monofunctional compounds and subsequently perform a cross-linking function in the finished microporous sheets.

The cationic polyurethanes are generally dispersed in water while they are being prepared or, alternatively, subsequent to their preparation. The dispersed polyurethanes may, of course, also contain groups, e.g. methylol ether groups, incorporated in the molecule for the purpose of subsequent cross-linking reactions.

A suitable cationic dispersion in a mixture of dimethyl formamide and water may, for example, be prepared as follows: A polyester, containing hydroxyl end groups, is reacted with a diisocyanate to form a prepolymer which is then diluted with dimethylformamide and reacted with N-methyldiethanolamine. This reaction is followed by quaternization with dichlorodurol (1,4-bis-(chloromethyl)-benzene) and the addition of phosphoric acid and a mixture of equal parts of dimethylformamide and water.

The preparation of anionic polyurethane or polyurethane urea dispersions may be carried out by known methods. Suitable anionic polyurethanes have been described, for example, in U.S. Pat. Nos. 3,461,103, 3,438,940; 3,539,483 and British Pat. No. 1,076,688. In a similar manner to the preparation of cationic dispersions, compounds which contain either anionic groups, or groups which can subsequently be converted into anionic groups, are used in addition to the usual glycols or diamines. The following are examples of such compounds: hydroxyl and mercapto acids, e.g. glyceric acid, citric acid or uric acid, amino acids, e.g. diaminonaphthoic acid, hydroxyl and carboxy sulphonic acids, e.g. 2-hydroxyethane sulphonic acid or p-sulphobenzoic acid, aminosulphonic acids, e.g. hydrazine disulphonic acid, 2,4-diaminotoluene sulphonic acid-(5) or aminoethylaminoethane sulphonic acid, derivatives of phosphinic, phosphonous, phosphonic and phosphoric acids, esters of phosphorous and phosphoric acid and their thioanalogues, e.g. phosphoric acid-bis-propylene glycol ester; hydrazine dicarboxylic acids and diaminoamidocarboxylic acids and their salts, e.g. sodium phthalate-bis-N,N-($\gamma$-aminopropyl)-amide; and the like.

The ionic dispersions may also be prepared from polyurethanes, containing free hydroxyl and/or amino groups, by reaction with aliphatic or aromatic aldehydes and, at the same time or subsequently, with a metal sulphite, hydrosulphite, aminocarboxylate or aminosulphate.

Another possible method of preparing the dispersions comprises reacting polyurethanes, containing free hydroxyl and/or amino groups, with cyclic compounds, having from 3 to 7 ring members and containing salt-type groups or groups which are capable of salt formation after ring opening, (see U.S. Pat. No. 3,461,103). These compounds include, in particular, the sultones, e.g. 1,3-propanesultone, 1,4-butanesultone or 1,8-naphthosultone, and lactones, e.g. $\beta$-propiolactone or $\gamma$-butyrolactone, as well as dicarboxylic acid anhydrides, e.g. succinic acid anhydride.

Cationic or anionic polyurethanes suitable for use according to the process of the present invention may also be prepared by formaldehyde polycondensation, according to DOS No. 1,770,068. In this method, higher molecular weight polyisocyanates are reacted with an excess of compounds which contain methylol end groups, (e.g. aminoformaldehyde resins or phenolformaldehyde resins), and the reaction product, which contains methylol groups, is then dispersed in water and finally cross-linked by heat treatment, with the formation of methylene bridges.

Products of the kind described in German Offenlegungsschriften Nos. 1,953,345; 1,953,348 and 1,953,349, may also be used as coagulation regulators in the present process. These products are aqueous dispersions of ionic emulsion polymers which have been prepared by radical emulsion polymerization of olefinically unsaturated monomers in the presence of cationic or anionic oligourethanes or polyurethanes.

Cationic or anionic polyurethanes are particularly preferred in accordance with the invention which exhibit some degree of cross-linking at the time of their use and not subsequently as in the case of the dispersions described above.

The present invention does not relate to the preparation of such cross-linked polyurethane particles. This may be carried out according to different methods known in principle to a person of skill in the art.

In general, cross-linked polyurethane particles can be prepared as a suspension in a suitable organic solvent or in water or even without the aid of a liquid medium. Furthermore, it is possible, if suitable reaction components are chosen, to use any of these processes in order to arrive at cross-linked particles directly, or first to prepare substantially linear, thermoplastic particles and then to cross-link them.

To prepare a suspension in an organic medium, a solvent is generally chosen in which one or a plurality of reactants dissolve, but not the high-molecular reactant. In the course of the reaction in such a medium, the initially formed solution is gradually converted into a suspension, this process being aided preferably by means of stirring. It is essential that cross-linking only takes place after formation of the disperse phase, as otherwise swelling will occur. Solvents can also be employed that dissolve the polyurethane under heat but not at room temperature, when the polyurethane is not yet crosslinked but already in a high-molecular state. The suspension can then be obtained from the solution by cooling and simultaneously stirring. This effect can also be achieved by the addition of a non-solvent, which, however, should be miscible with the solvent. The formation of a disperse phase with the desired particle size can be influenced by the addition of suitable dispersing agents.

A variety of processes are known for preparing finely divided polyurethane in aqueous media. For example, the solution of a polyurethane in a solvent non-miscible with water can be dispersed in water in the presence of an emulsifier and the organic solvent removed by distillation. A particularly preferred method consists in mixing ionically and/or hydrophilically modified polyurethanes with water with or without a solvent, this leading to the formation of polyurethane suspensions depending on the starting components and the reaction conditions. A particularly preferred embodiment of this process consists in employing polyurethane prepolymers with terminal isocyanate groups or methylol groups; in this instance either very high percentage solutions can be employed or no solvents at all. The primarily formed coarse emulsions are converted by reaction of the isocyanate groups with water or with diamines or polyamines dissolved in the aqueous phase into high-molecular polyurethane urea suspensions accompanied by chain-lengthening and cross-linking. The chain-lengthening of prepolymers containing methylol groups can be achieved for example by heating or by lowering the pH value.

Suitable suspensions can also be prepared by feeding high-molecular polyurethanes or reactive NCO-prepolymers through nozzles into water or organic non-solvents.

All methods proposed for the preparation of polyurethane dispersions or latices are also suitable in principle for the preparation of polyurethane suspensions as long as care is taken that these suspensions do not coalesce by sedimentation or shearing forces. This means that the primarily formed suspension of insufficiently high molecular weight should be kept in motion until the dispersed particles have lost their tackiness. To cross-link the dipersed particles, a low amount of starting materials which are more than bifunctional can be employed in the synthesis of the polyurethane, for example, branched polyesters or polyethers or triisocyanates or triols or it is possible to react an initially linear NCO prepolymer, i.e. prepared from bifunctional components, with higher functional amines to produce a cross-linked polyurethane urea. It, however, is also possible to synthesize cross-linked particles from purely bifunctional components by working under conditions which cause branching to take place, e.g. by the addition of catalysts which favour isocyanate trimerisation or the formation of allophanate or biuret structures. The use of more than equivalent amounts of isocyanate in relation to the hydroxyl or amino compounds frequently leads to cross-linking in the presence of water and/or diamines.

Linear, high-molecular polyurethanes in the form of a suspension in a liquid medium or in powder form can also be subsequently cross-linked, e.g. by treatment with polyisocyanates or formaldehyde or compounds splitting off formaldehyde. Products which contain basic groups, can be cross-linked for example with polyfunctional quarternizing agents or acids, and products which contain acidic groups, with metal oxides or polyamines. Agents suitable for cross-linking polyurethanes, which contain unsaturated double bonds, are, for example, compounds yielding radicals known per se or sulphur, polymercaptanes, and other agents which are at least bifunctional and capable of reacting with double bonds.

The solvent-free preparation of cross-linked polyurethane particles can be carried out, for example, by pulverisation of polyurethane elastomers, e.g. in an impact pulverizer. It is particularly expedient to pulverize the elastomer immediately after its production when it is no longer tacky, but the reaction is not completely finished so that it can be comminuted with the least possible consumption of energy.

A detailed description of the production of cross-linked ionic polyurethane suspensions is to be found, for example, in German Auslegeschriften No. 1,495,745 (U.S. Pat. No. 3,479,310) 1,282,962 (Canadian Pat. No. 837,174) and 1,694,129 (British Pat. No. 1,158,088) as well as the German OS No. 1,595,687 (U.S. Pat. No. 3,714,095), 1,694,148 (U.S. Pat. No. 3,622,527), 1,729,201 (British Pat. No. 1,175,339) and 1,770,068 (U.S. Pat. No. 3,756,992).

The particular importance of the chemically cross-linked ionic polyurethane suspensions for the process of the invention is, as was surprisingly found, that in very many cases it is possible to produce satisfactory microporous surface structures with the addition of such cationic or anionic suspension alone. In that case, the ionic polyurethane suspensions, however, must meet the following criteria:

(a) the suspension must be sedimenting but redispersible, (b) particle size: 0.8 - 100 μ, preferably 2 - 50 μ, (c) the polyurethane must be chemically so far cross-linked that it does not dissolve in boiling DMF.

The advantage of these embodiment of the process in accordance with the invention lies in the simplicity with which processing may be carried out, as only one single coagulation regulator need be added. In the case of certain elastomer types using carbodihydrazide as a chain-lengthening agent, however, the addition of cationic or anionic suspensions alone is not always sufficient (see Example 3*).

Combinations between cationic and anionic polyurethane dispersions, however, are preferably used in accordance with the invention. These result, on the one hand, in more reliable production (particularly when performed on an industrial scale) and, on the other hand, the addition of a quantity of ionic groups would be sufficient which is lower in relation to the polymer solids. Furthermore, dispersions may also be employed in this case which do not have to satisfy the above criteria (e.g. those with a small particle size the major part of which is chemically not cross-linked and therefore not soluble in DMF).

Formulation of the elastomer solutions may be carried out by various methods. In many cases, it is advisable to first introduce the non-ionic elastomer solution into the reaction vessel and then mix the solution successively with the cationic and/or anionic dispersion, in either sequence, with vigorous stirring, until a homogeneous mixture is obtained. Care must be taken to ensure that, if purely aqueous ionic polyurethane dispersions are used, a solvent which is miscible with water, e.g. dimethylformamide or dimethyl sulphoxide, is first added thereto so that localized coagulation will not occur when they are added to the elastomer solution.

Alternatively, the dispersions with opposite charges may be mixed very vigorously and the precipitated polyurethane or polyurethane urea salt may then be filtered, by suction, to remove low molecular weight ionic constituents, and then taken up in an organic solvent. The gel obtained in this way may then be stirred into the non-ionic elastomer solution as a coagulating agent. When this last mentioned method is employed, the coagulation bath does not contain any low molecular weight compounds; this is an advantage when recovering the organic solvent.

If desired, the formulation may be obtained directly from cationic or anionic polyurethane or polyurethane urea powders. The powders may be made up into a paste with a solvent, as described above, and then stirred, in the form of gels, into the elastomer solution, a suspension being thereby formed.

In a particular method of carrying out the present process, polyurethanes or polyurethane ureas, which contain polysiloxane groups, or ionic polyurethane or polyurethane urea dispersions which contain the following structural unit

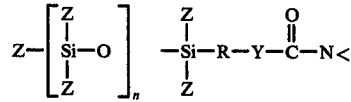

are used as cell stabilizers and cell regulators.

In the above formula, $n \geq 2$, preferably a number from 5 to 100, $Z = C_1$-$C_5$ alkyl, $C_6$-$C_{15}$ aryl, or a siloxyl or siloxanyl group, preferably, Z is a methyl group, or a

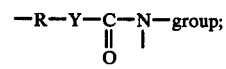

the groups Z may be the same or different, but preferably, only one of the substituents Z attached to a silicon atom is

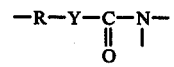

R = alkylene group, optionally containing hetero atoms and Y = —NH—, —O— or —S—.

The total siloxane group content of the microporous polyurethane sheet is from about 0.1% to about 20% by weight, preferably from about 0.3 to about 5%, by weight.

It is essential that the siloxane groups are chemically built into the polyurethane by way of carbon bridges, e.g. in accordance with the formula

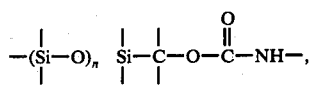

Polyurethane polysiloxanes of this kind have been described in German Auslegeschriften No. 1,114,632; U.S. Pat. No. 3,296,190 and British Pat. No. 1,176,490. These polyurethane polysiloxanes may be prepared from organopolysiloxanes, which contain at least one, preferably two, carbofunctional groups which are attached to silicon and carry hydrogen atoms which are reactive with isocyanates. The carbofunctional groups are preferably aliphatic hydrocarbon groups, containing 1 to 6 carbon atoms, which may contain hetero atoms, and carry at least one hydroxyl, carboxyl, mercapto or primary or secondary amino group.

The organopolysiloxanes may be prepared by known methods. For example, hydroxymethylpolysiloxanes, which are particularly suitable, may be obtained by direct reaction of bromomethylpolysiloxanes with alcoholic potassium hydroxide solution. 4-Aminobutyl-polysiloxanes are prepared by hydrogenation of the readily available nitriles and the corresponding carboxyl derivatives by saponification of cyanoalkylsilicon compounds. Aminomethylsiloxanes are prepared by amination of the corresponding halomethylsilicon compounds with ammonia or primary amines.

In many cases, the functional groups are first introduced into a low molecular weight siloxane. The resulting products are then converted into higher molecular weight polysiloxanes by the known equilibration reaction.

Polysiloxanes which contain at least two, preferably from about 5 to about 100, siloxane groups and have a molecular weight of from about 194 to about 20,000, preferably about 500 to about 6000, are preferred. Aqueous polyurethane-polysiloxane dispersions may also be prepared from polyfunctional organopolysiloxanes. Organopolysiloxanes of this kind have been described, for example, in French Patent Specification No. 1,291,937 and in German Auslegeschrift No. 1,114,632.

The polymer solutions may also contain additives without thereby impairing their coagulation characteristics. Suitable additives are e.g. polyvinyl chloride and its copolymers, polyacrylonitrile and its copolymers, carboxymethylcellulose, polyalkyl acrylates and methacrylates, emulsifiers, optical brightening agents, antioxidants, light protective agents, e.g. N,N-dialkylhydrazides, cross-linking agents, e.g. paraformaldehyde, melamine hexamethylol ethers or other formaldehyde derivatives, polyisocyanates, quaternizing agents or polyaziridine ureas and dyes, preferably insoluble pigments.

The coagulability of the polyurethane solutions may also be influenced, if desired, by adding non-solvents, preferably water, to the coagulable polyurethane systems. The maximum quantity of non-solvent which may be added is reached when the polyurethane starts to precipitate. Nonsolvent, e.g. water, may also be introduced into the system in the ionic polyurethane dispersions. Additional nonsolvents may also be added in this case. The non-solvent is generally not added in its pure form but as a mixture with solvents e.g. in the form of a mixture of dimethylformamide and water. The total quantity of non-solvent in the coagulable mixture should generally not exceed about 9%, by weight, and should preferably not exceed about 6%, by weight.

The use of the additives in the present process, in particular together with the polyurethane-polysiloxanes described above, has the important advantage that accurate measurement of the quantity of non-solvent, as was necessary in the conventional processes, (for example, at the stage of pre-gelling on a movable support by means of water vapor), is no longer required. Furthermore, the composition of the coagulation bath is now only of minor importance. For example, according to the present invention, products with excellent properties are obtained when polyurethane solutions, which contain coagulation regulators, are directly coagulated in water without the addition of non-solvent.

In a continuous process for producing microporous sheets, the mixture, (polyurethane solution, cationic and anionic polyurethane dispersion and, optionally, polyurethane polysiloxane) is applied to a porous or non-porous substrate, e.g. by brush coating, pouring or application with a coating knife, and the layer applied to a support. If desired, this may then be passed through a treatment chamber, containing a damp atmosphere in which the layer gells to form a sheet, and then the material is passed through coagulation, washing and after-treatment baths, the latter being optionally an alcohol bath. The microporous sheet is then dried.

The thickness in which the layer is applied depends on the desired final thickness of the microporous sheet. It is generally sufficient to apply the polyurethane mixtures in thicknesses of from 0.5 to 1.5 mm. A porous substrate would be used if it is to be directly coated with the polyurethane mass. Suitable porous substrates are, e.g. woven and knitted fabrics, non-woven webs or felts, random fiber fleeces may also be microporously bonded with the polymer mixture solutions.

A non-porous substrate, e.g. a glass plate, metal belt (optionally with a structured surface) or woven web coated with synthetic resins, e.g. perfluoropolyethylene, is used if it is desired to obtain porous polyurethane sheets which are to be removed and transferred, e.g. by glueing, by the reversal process to other substrates which are permeable to water vapor. Suitable substrates for this purpose are, for example, split leather, cardboard, paper or woven and non-woven textile sheets.

The permeability to water vapor quoted in the examples was determined by the method of described in "Das Leder" 1961, pages 86–88, which measures the permeability to water vapor in [mg/h.cm$^2$] (measured at normal pressure and a relative humidity of 65% at 20° C). The tensile strength, elongation at break and moduli and other elastic properties of the microporous sheets were determined by conventional methods.

The strength properties of the microporous films are, of course, generally lower the higher the permeability to water vapor. Even for a given permeability to water vapor, the strength properties depend, to a major extent, on the quality and uniformity of the microporous structure, which in turn are determined by the coagulation process employed. It is a particular advantage of the present process that it gives rise to uniformly microporous sheets which have a good surface, high temperature resistance, high strength properties and significantly higher abrasion resistances than those obtained by other processes and is still highly permeable to water vapor. Furthermore, it is unnecessary to use an accurately measured quantity of non-solvent and the time required for carrying out the process may be shortened.

The microporous products provided by this invention may be used for making shoes, raincoats and other rainwear clothing and the like.

The following Examples and comparative Examples illustrate the invention.

(1) Preparation of the elastomer solutions
Product 1.1

A prepolymer prepared by reacting 1240 parts, by weight, of polyester A and 310 parts, by weight, of 4,4'-diphenylmethane diisocyanate under substantially anhydrous conditions, is diluted with a total of 4700 parts, by weight, of dimethylformamide and reacted with 50 parts, by weight of carbodihydrazide in 100 parts, by weight, of water. The 25% elastomer solution has a viscosity of from about 25,000 to 50,000 cP at 25° C.

Polyester A:
adipic acid esterified with ethylene glycol/butane-1,4-diol (molar ratio 1:1); OH number 56, acid number 1.

Product 1.2

An elastomer granulate, prepared by melt phase polyaddition at from 110° to 140° C from the following components:
  50 parts, by weight, of Polyester A,
  50 parts, by weight, of Polyester B,
  48 parts, by weight, of diphenylmethane-4,4'-diisocyanate and
  13 parts, by weight, of butane-1,4-diol,
is dissolved in dimethylformamide at 50° C to form a 25% solution. A homogeneous solution with a viscosity of from 15,000 to 60,000 cP is obtained.

Polyester B:
Hexane-1,6-diol polycarbonate: OH number 56, acid number 1.

(2) Preparation of the cationic polyurethane suspensions
Product 2.1

900 parts, by weight, of polyester C are reacted under anhydrous conditions with
  231 parts, by weight, of tolylene diisocyanate (65:35 mixture of 2,4- and 2,6-isomers) at from 70° to 75° C for 2 hours.

The prepolymer is then diluted with 756 parts, by weight, of dimethylformamide at 50° C. 91 parts, by weight, of N-methyl diethanolamine are added, followed, after a further 30 minutes by 24.5 parts, by weight, of dichlorodurol in 150 parts, by weight of dimethylformamide. The quaternizing reaction is completed after one hour at 50° C.

24 parts, by weight, of 90% phosphoric acid in 100 parts, by weight, of water, 880 parts, by weight, of dimethylformamide, which has been heated to 50° C, and 1070 parts, by weight, of water, at 30° C, are then added. After the mixture has been stirred for ½ hour, the resulting dispersion which has a solids content of about 28%, by weight, is left to cool.

Polyester C: adipic acid/phthalic acid (molar ratio 1:1) esterified with ethylene glycol; OH number 62, acid number 1.

Product 2.2

960 parts, by weight, of polyester C are reacted under anhydrous conditions with 228 parts, by weight, of hexamethylene-1,6-diisocyanate at from 100° to 110° C for 2 hours, with stirring, and then cooled to 50° C.
  28.4 parts, by weight, of N-methyldiethanolamine are then added, followed, after 30 minutes, by
  29.6 parts, by weight, of dimethylsulphate in 150 parts, by weight, of dimethylformamide.

After a further 15 minutes, the prepolymer is diluted with 1096 parts, by weight, of dimethylformamide at 50° C and adjusted to room temperature. NCO content of the prepolymer: 2.56%.

The 50% prepolymer solution is reacted with 270 parts, by weight, of 18.1% aqueous diethylene triamine solution with the addition of 2060 parts, by weight, of dimethylformamide/water (proportion, by weight: 55:45), with vigorous stirring, at from 18° to 25° C. Stirring is then continued for a further 3 hours.

The sedimenting but redispersible suspension consists of 27%, by weight, of solids, 50% of DMF and 23% of water.

(3) Preparation of anionic polyurethane suspensions
Product 3.1 (aliphatic compound)

5200 parts, by weight, of 50% prepolymer solution of Polyester C and hexamethylene-1,6-diisocyanate in dimethylformamide (NCO content = 3.72%) are reacted with vigorous stirring at 20° C with
  1403 parts, by weight, of a 23.8% aqueous solution of sodium β-aminoethyl-aminoethane sulphonate and
  223 parts, by weight, of a 13% aqueous solution of diethylene triamine in
  1634 parts, by weight, of a dimethylformamide/water mixture (proportion by weight 48/52).

The sedimenting but redispersible suspension contains 35% of solids, 25% of water and 40% of DMF.

Product 3.2 (aromatic compound)

4885 parts, by weight, of a 50% DMF prepolymer solution (NCO content 3.46%) prepared from 8000 parts, by weight, of polyester C and 2400 parts, by weight, of tolylene diisocyanate (80:20 mixture of 2,4- and 2,6-isomers) are reacted with a 20% aqueous solution of
  1125 parts, by weight, of diethylene triamine and 327 g of the sodium salt of aminoethylamino-ethane sulphonic acid (amine equivalent ratio 4:1) in
  1620 parts, by weight, of dimethylformamide/water (ratio by weight 32:68) to form a sedimenting but redispersible polyurethane suspension as described for product 3.1. The suspension contains 35% of solids, 40% DMF and 25% water.

(4) Preparation of the polyurethane urea salts

A cationic dispersion is introduced into a reaction vessel at room temperature and an anionic suspension is slowly added with vigorous stirring. When phase separation takes place, the mixture is homogenized with dimethylformamide. Stirring is continued for one more hour. The polyurethane salt is then precipitated with approximately and equal quantity of methanol/water (ratio 1:1). After complete precipitation, (from 1 to 3 hours), the polyurethane salt is filtered by suction and washed, repeatedly, with small portions of methanol. The moist filter cake is then immediately taken up in dimethylformamide. The thus obtained gel-like polyurethane or polyurethane urea salt may be directly suspended in a polyurethane elastomer solution, to act as coagulating agent, at any time thereafter.

Product 4.1
  obtained from cationic dispersion 2.2 and anionic suspension 3.1.

Solids content 15%
Water content 7%
DMF/CH₃OH content 78%
Ionic ratio
cation: anion = 5:1.
Product 4.2
obtained from cationic dispersion 2.2 and anionic suspension 3.2.
Solids content 11.5%
Water content 6.5%
DMF/CH₃OH content 82.0%
Ionic ratio
cation: anion = 3:1.

(5) Preparation of the polyurethane or polyurethane urea polysiloxanes

Product 5.1
Non-ionic polysiloxane obtained from:
125.00 parts, by weight, of Polyester D,
25.15 parts, by weight, of hexamethylene diisocyanate,
96.15 parts, by weight, of carbofunctional siloxane (Formula I; $n$ about 14; OH content 2.7%, by weight; Molecular weight = 1250) (39.1%, by weight, on the total solids content) and
146.30 parts, by weight, of dimethylformamide (NCO:OH ratio = 1.00).

The dehydrated polyester is reacted under anhydrous conditions with hexamethylene diisocyanate, with stirring, for 30 minutes at 100° C. The NCO content of the reaction product after the reaction is 4.3% (theoretical 4.26%).

The carbofunctional polysiloxane is then stirred into the reaction product, also at 100° C, and reacted for 3 hours. After ½ hour, the reaction mixture gradually becomes homogeneous. The NCO content of the reaction mixture is: after 60 minutes = 0.25%, by weight, after 120 minutes = 0.15%, by weight, and after 180 minutes = 0.02%, by weight. After 3 hours, the reaction is virtually complete.

The reaction mixture is then diluted with dimethylformamide in three portions (1:2:2) and stirred for one hour. After termination of the reaction, the viscosity of the 50% solution is from 5000 to 10,000 cP at 25° C.
Polyester D:
Polyester D: from hexandediol/neopentylglycol (1:1) and adipic acid (OH number 66, acid number 1). Carbofunctional Siloxane:

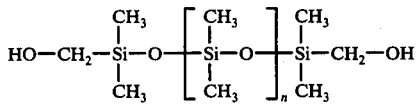

(I)

Product 5.2
Anionic polyurethane urea polysiloxane
A 50% prepolymer solution (NCO content 3.8%) is first prepared from
960 parts, by weight, of polyester D,
300 parts, by weight, of hexamethylene-1,6-diisocyanate,
60 parts, by weight, of organofunctional siloxane (formula I; $n$ about 11; OH content 3.2% by weight; Molecular weight = 1060), and
1320 parts, by weight, of dimethylformamide.
This prepolymer is then chain lengthened with
794 parts, by weight, of a 21.8% aqueous solution of sodium β-aminoethylaminoethanesulphonate and
111 parts, by weight, of a 14.4% aqueous solution of diethylene triamine in
770 parts, by weight, of dimethylformamide/water (ratio 57 : 43) under conditions of vigorous stirring at 20° C.

Product 5.3
Cationic polysiloxane polyurethane from
24.3 parts, by weight, of polyester C,
6.08 parts, by weight, of hexamethylene diisocyanate,
0.758 parts, by weight, of N-methyldiethanolamine,
0.795 parts, by weight, of dimethylsulphate and
13.6 parts, by weight, of organofunctional siloxane (Formula I; $n$ about 14; OH content: 2.7%, by weight; Molecular weight = 1250) (29.9%, by weight, based on the total solids content).

The polyester is dehydrated under vacuum for 30 minutes at 130° C and the hexamethylene diisocyanate is then added at 100° C. After a reaction time of one hour at 100° C, the isocyanate content is 6.20% (theoretical 6.05%).

When the reaction mixture has cooled to 60° C, methyl diethanolamine is stirred in and reacted for one hour at this temperature. The reaction mixture is then diluted with 18.4 parts, by weight, of dimethylformamide and, after a further 10 minutes, the dimethylsulphate, dissolved in 1.2 parts of DMF, is added.

A further 12.4 parts, by weight, of dimethylformamide are then added at 60° C. When the theoretical isocyanate content (2.05%) has been reached, the organofunctional siloxane is stirred in and reacted at from 60° to 70° C until the reaction has gone to completion.

The viscosity of the final solution is 4300 cP. The solution may be diluted with any amount of water.

(6) Preparation of the microporous sheets
The coagulating agent is added, portionwise, to the polyurethane or polyurethane urea solution, heated to from 50° to 80° C, (viscosity of a 22% solution at 25° C: from 10,000 to 30,000 cP), and uniformly suspended in the solution by vigorous stirring. Before coagulation takes place, the reaction mixture is degasified under vacuum until all the air has been removed.

The bubble-free reaction mixture is applied to a glass plate or a moveable steel belt, 2 $m$ in width, and its thickness is adjusted to about 1.5 mm with a wiper. The coated substrate is then passed through a pre-gelling zone where it is exposed to moist air (from 30 to 70% relative humidity at from 50° to 98° C). It is then passed through a bath of water, the sheet thus being finally coagulated. The sheet is then washed and dried, in a heating zone at about 100° C.

In Examples 6* and 9 a woven cotton fabric is directly coated.

The physical data shown in the Table apply to the microporous sheet without a support.

The coagulated sheets and coatings have a thickness of 0.33 ± 0.03 mm.

The results of the experiments are summarized in the following table.
Explanations:
The examples marked with * are to be regarded as comparative Examples.

The quantities given are parts by weight based on the solids content.

"Tanigan" is a phenol formaldehyde condensate which contains sodium sulphonate groups.

"Solids loss" means the quantity of substance washed away in the coagulation process.

"Surface shrinkage" denotes the difference in surface area between the elastomer solution originally applied and the dried sheet.

The flexural strength was determined on a Balli-Flexometer.

PWV = permeability to water vapour.

| Ex. No. | Elastomer solution 100 parts by weight | Ionic polyurethane Cationic | Ionic polyurethane Anionic | PUR salt | PUR polysiloxane | "Tanigan" | Solids loss (%) |
|---|---|---|---|---|---|---|---|
| 1* | 1.1 | 25 parts 2.1 | — | — | — | — | — |
| 2* | 1.1 | 37 parts 2.1 | — | — | — | — | — |
| 3* | 1.1 | — | 37 parts 3.1 | — | — | — | — |
| 4* | 1.1 | 25 parts 2.1 | — | — | — | 6 | 6.5 |
| 5* | 1.1 | 20 parts 2.1 | — | — | — | 5 | 16.5 |
| 1 | 1.1 | 25 parts 2.1 | 6 parts 3.1 | — | — | — | 0.4 |
| 2 | 1.1 | 25 parts 2.1 | 6 parts 3.1 | — | 0.6 parts 5.1 | — | 0 |
| 3 | 1.1 | 25 parts 2.1 | — | — | 6 parts 5.2 | — | 0 |
| 4 | 1.1 | — | 6 parts 3.1 | — | 25 parts 5.3 | — | 0 |
| 5 | 1.1 | 20 parts 2.1 | 5 parts 3.2 | — | — | — | 0.3 |
| 6 | 1.1 | 25 parts 2.1 | 6 parts 3.2 | — | — | — | 0.4 |
| 7 | 1.1 | — | — | 25 parts 4.1 | — | — | 0.4 |
| 8 | 1.1 | — | — | 25 parts 4.2 | — | — | 0.2 |
| 6* | 1.2 | 17 parts 2.1 | — | — | — | — | 7.5 |
| 9 | 1.2 | — | — | 17 parts 4.1 | — | — | 0.2 |

| Ex. No. | Surface shrinkage (%) | Flexural strength (Balli-Flexometer) | Tensile strength (kp/cm) | Elongation at break (%) | PWV mg/cm². h | Remarks |
|---|---|---|---|---|---|---|
| 1* | 41 | — | — | — | 0 | homogeneous sheet |
| 2* | 43 | — | — | — | 0 | homogeneous sheet |
| 3* | 40 | — | — | — | 0 | homogeneous sheet |
| 4* | 18 | — | — | — | 8 | irregular surface |
| 5* | 26 | — | — | — | 3 | only partially microporous |
| 1 | 11 | >200 000 | 98 | 595 | 11 | good pore structure |
| 2 | 9 | >200 000 | 122 | 520 | 15 | uniform fine pores |
| 3 | 10 | >200 000 | 140 | 490 | 14 | uniform fine pores |
| 4 | 11 | >200 000 | 119 | 515 | 12 | uniform fine pores |
| 5 | 12 | >200 000 | 130 | 650 | 14 | good pore structure |
| 6 | 11 | >200 000 | 117 | 610 | 17 | good pore structure |
| 7 | 9 | >200 000 | 116 | 615 | 14 | very good pore structure |
| 8 | 8 | >200 000 | 140 | 630 | 14 | very good pore structure |
| 6* | 15 | >200 000 | — | — | 7 | irregular surface |
| 9 | 8 | >200 000 | 102 | 540 | 15 | uniformly microporous |

EXAMPLE 10

(a) Production of a cationic, cross-linked polyurethane urea suspension 79.5 mol of polyester C are dehydrated in vacuo for 30 minutes at 130° C, then stirred for 1 hour at 100° C with 138 mol of toluylene-diisocyanate (2,4-/2,6-isomer mixture in a ratio of 65 to 35) and 177 mol of 1,6-hexamethylene diisocyanate and the product thereafter cooled to 60° C. A solution of 37.8 mol of N-methyldiethanol amine in 13.5 kg of acetone is then added, the mixture stirred for another hour at 60° C and diluted with 32 kg of acetone. The prepolymer is storable for a few days.

Before the prepolymer is dispersed, it is diluted, whilst quaternizing with 35 mol of dimethylsulphate, with acetone to 50%. The NCO content then amounts to about 4.4% by weight. The dilute ionomer solution is reacted, whilst vigorously stirring, with an aqueous solution of diethylene triamine at 15° to 30° C (equivalent ratio of $NCO/NH_2$ = 1.10). The acetone is subsequently distilled off at bath temperatures of about 80° C whilst passing in nitrogen. Dimethyl formamide is added to the aqueous dispersion after decanting the serum, and the water partly removed by distillation in vacuo.

The resulting redispersible, cationic suspension has a mean particle size of about 10 to 20 μ and consists of 28.6% by weight of solids, 43.9% by weight of DMF and 27.5 % by weight of water.

(b) Production of an anionic, cross-linked polyurethane urea suspension

Analogously to a), a 50% prepolymer (3.55% by weight of NCO) prepared from 89.5 mol of polyester C and 250 mol of 1,6-hexamethylene diisocyanate is reacted with a mixture of diethylene triamine and β-aminoethyl aminoethane sodium sulphonate at $NCO/NH_2$ = 1.04 (the equivalent ratio between triamine and diamino sulphonate amounts to 1 : 2).

A storable, redispersible, anionic dispersion consisting of 28% by weight of solids, 44.5% by weight of DMF and 27.5% by weight of water with a mean particle diameter of 5 - 10μ is obtained.

(c) Production of the elastomer solution

Elastomer granules are produced by melt phase polyaddition at 110° to 140° C from the following components:

50 parts by weight of polyester A, 50 parts by weight of polyester B,
48 parts by weight of 4,4'-diphenylmethane diisocyanate,
13 parts by weight of 1,4-butanediol.

25% of the elastomer is dissolved at 50° C in dimethylformamide. A homogeneous solution is obtained with a viscosity of 15 000 to 60 000 centipoises.

(d) Production of the microporous foils

Suspension (a) or (b) is added little by little to the polyurethane urea solution which has been heated to 50° to 80° C and homogenized by vigorously stirring. The solids ratio between non-ionic elastomers and ionic polyurethane urea amounts to 4 to 1. Before coagulating the formulation which has great storage stability is degassed in vacuo until the air, which was stirred in, is completely removed.

The bubble-free formulation is applied to a glass plate or a movable steel belt 2 meters wide and levelled off to a thickness of approximately 1.5 mm with a doctor blade. The coating is then conducted through a pre-gelling zone and exposed there to damp air with 50% relative humdity at 60° C. The coated steel belt is thereafter conveyed into a water bath where the foil finally coagulates. The foil is washed and dried in a heating zone at approximately 100° C.

The coagulated foils or coatings have a thickness of 0.33±0.03 mm.

Microporous surface structures are obtained using both cross-linked polyuretane urea suspensions a) or b) and when tested on the Bally Flexometer these display a loop strength of over 200 000. The permeability to water vapour of the cationically coagulated foil is 6 mg/cm² per hour, that of the anionically coagulated foil 2 mg/cm² per hour.

The formulations in accordance with Example 10 can be applied in an analogous manner to a textile substrate and therafter coagulated in a water bath.

What is claimed is:

1. A microporous sheet prepared by coagulation of a solution containing a non-ionic polyurethane in a polar solvent therefor mixed with an aqueous dispersion of a cationic polyurethane and an anionic polyurethane with a non-solvent for said non-ionic polyurethane.

2. A microporous sheet prepared by coagulation of a solution containing a non-ionic polyurethane in a polar solvent therefor mixed with an aqueous dispersion of either a cationic polyurethane or an anionic polyurethane with a non-solvent for the polyurethane, said aqueous dispersion being sedimenting and redispersible, having a particle size of 0.8 to 100 microns, and being insoluble in boiling dimethylformamide.

3. In a process for making microporous sheets which are permeable to water vapor comprising coagulating a hygroscopic polyurethane solution, the improvement which comprises mixing a suspension of a cationic polyurethane and an anionic polyurethane with a solution containing a non-ionic polyurethane in a polar solvent therefor before coagulation of the solution.

4. The process of claim 3, wherein said suspension contains a non-ionic or an ionic polyurethane polysiloxane.

5. The process of claim 3, wherein the polyurethane solute in the solution is a non-ionic polyurethane substantially free from urea linkages.

6. The process of claim 3, wherein at least one of the polyurethanes is a polyurethane urea.

7. The product of the process of claim 3.

8. A method for making a microporous sheet which comprises coating a substrate with a hygroscopic solution containing a non-ionic polyurethane dissolved in a polar solvent therefor mixed with an aqueous dispersion or colloidal solution of a cationic polyurethane and an anionic polyurethane, and exposing the coating to moisture.

9. In a process for making microporous sheets which are permeable to water vapor comprising coagulating a hygroscopic polyurethane solution the improvement which comprises mixing a suspension of either a cationic polyurethane or an anionic polyurethane with a solution containing a polyurethane in a polar solvent therefor before coagulation of the solution, wherein said cationic or anionic polyurethane suspension is sedimenting and redispersible, has a particle size of 0.8 to 100 microns, and is insoluble in boiling dimethylformamide.

10. The process of claim 9, wherein said suspension contains a non-ionic or an ionic polyurethane polysiloxane.

11. The process of claim 9, wherein the polyurethane solute in the solution is a non-ionic polyurethane substantially free from urea linkages.

12. The process of claim 9, wherein at least one of the polyurethanes is a polyurethane urea.

13. The product of the process of claim 9.

14. A method for making a microporous sheet which comprises coating a substrate with a hygroscopic solution containing a non-ionic polyurethane dissolved in a polar solvent therefor mixed with an aqueous dispersion or colloidal solution of either a cationic polyurethane or an anionic polyurethane and exposing the coating to moisture, said aqueous dispersion or said collodial solution being characterized as being sedimenting and redispersible, having a particle size of 0.8 to 100 microns, and being insoluble in boiling dimethylformamide.

* * * * *